United States Patent [19]
Noguchi et al.

[11] 4,125,094
[45] Nov. 14, 1978

[54] INTERNAL COMBUSTION ENGINE WITH AN AUXILIARY COMBUSTION CHAMBER

[75] Inventors: Masaaki Noguchi, Nagoya; Yukiyasu Tanaka, Okazaki; Taro Tanaka, Chiryu, all of Japan

[73] Assignees: Toyota Jidosha Kogyo Kabushiki Kaisha, Toyota; Nippon Soken, Inc., Nishio, both of Japan

[21] Appl. No.: 773,934

[22] Filed: Mar. 3, 1977

[30] Foreign Application Priority Data

Dec. 25, 1976 [JP] Japan .................. 51/157213

[51] Int. Cl.² .................. F02B 3/02; F02B 23/10
[52] U.S. Cl. .................. 123/32 ST; 123/32 SP; 123/32 K; 123/32 L; 123/33 D; 123/191 S; 123/191 SP; 123/75 B
[58] Field of Search .......... 123/32 ST, 32 SP, 32 K, 123/32 L, 32 C, 33 D, 75 B, 191 S, 191 SP

[56] References Cited

U.S. PATENT DOCUMENTS

| | | | |
|---|---|---|---|
| 1,907,095 | 5/1933 | Adams | 123/33 D |
| 2,242,274 | 5/1941 | Thysse | 123/33 D |
| 3,270,721 | 9/1966 | Hideg et al. | 123/32 ST |
| 3,933,134 | 1/1976 | Yagi et al. | 123/32 SP |
| 3,977,380 | 8/1976 | Atsumi et al. | 123/32 SP |
| 4,038,959 | 8/1977 | Takizawa et al. | 123/32 SP |
| 4,071,001 | 1/1978 | Goto | 123/75 B |

FOREIGN PATENT DOCUMENTS 1,137,897 10/1962 Fed. Rep. of Germany ........ 123/32.91

Primary Examiner—Charles J. Myhre
Assistant Examiner—P. S. Lall
Attorney, Agent, or Firm—Stevens, Davis, Miller & Mosher

[57] ABSTRACT

Disclosed is an internal combustion engine comprising a main combustion chamber and an auxiliary combustion chamber. The auxiliary combustion chamber comprises a first and a second auxiliary chambers. The first auxiliary chamber has a spark plug therein and is connected to the main combustion chamber. The second auxiliary chamber has a fuel injection nozzle therein and is connected to the first auxiliary chamber and to the main combustion chamber. Air or a lean air-fuel mixture is introduced into the main combustion chamber via the intake valve. An extremely rich air-fuel mixture is formed into the second auxiliary chamber. The extremely rich air-fuel mixture is introduced into the first auxiliary chamber and a combustible mixture is formed in the first auxiliary chamber. The combustible mixture is ignited and a burning gas is injected into the main combustion chamber. A part of the burning gas is introduced into the second auxiliary chamber and, as a result, the extremely rich air-fuel mixture in the second auxiliary chamber is pushed out into the main combustion chamber. The entire extremely rich air-fuel mixture is burned in the main combustion chamber.

15 Claims, 6 Drawing Figures

INTERNAL COMBUSTION ENGINE WITH AN AUXILIARY COMBUSTION CHAMBER

DESCRIPTION OF THE INVENTION

The present invention relates to an internal combustion engine with an auxiliary combustion chamber in which the electrode of a spark plug and a fuel injection nozzle is located.

Recently, from a natural resources savings point of view, a low fuel consumption engine is very much required. In view of this point, while a diesel engine is superior to any other engine, a diesel engine has the disadvantages that its specific horse power (a ratio of an output power to the weight of an engine) is relatively small and the engine is very noisy. Consequently, a spark ignition engine using gasoline which has a low fuel consumption equal to or superior to the fule consumption of a diesel engine is very much required.

As is known to those skilled in the art, in a spark ignition engine, a limit to the ignition of a combustible mixture exists. Consequently, if the combustible mixture located around the spark plug is extremely lean, it can not be ignited. In addition, an ordinary engine equipped with a carburetor has a disadvantage in that, when the throttle valve is closed, a throttling loss is caused. In an ordinary engine of this type, a uniformly mixed air-fuel mixture is introduced into the cylinder of the engine and, particularly at the time of idling and at the time when the engin is operating under a light load, it is preferable that a lean air-fuel mixture be introduced into the cylinder. In order to feed a lean air-fuel mixture into the cylinder and eliminate the above-mentioned throttling loss at the time of, for example, idling, there is a method of opening the throttle valve to a great extent and feding into the cylinder a combustible mixture consisting of a large amount of air and a small amount of fuel. However, in this method, the combustible mixture becomes extremely lean and, as a result, it can not be ignited. Consequently, in a conventional Otto-cycle gasoline engine, it is necessary to restrict the amount of air introduced into the cylinder by using a throttle valve at the time of idling and at the time the engine is operating under a light load.

On the other hand, as is known to those skilled in the art, if the introduced air is not restricted by a throttle valve and the regulation of load level is effected only dependent upon the regulation of the feeding amount of fuel, fuel consumption is extremely improved. As an example of a gasoline engine adopting the above system, which has been successfully put into practical use, there is known a famous direct fuel injection type stratified engine using the PROCO system (FORD) and TCCS system (TEXACO), etc. In an engine of this type, in view of the mean value of the air-fuel ratio of the mixture introduced into the cylinder, the ignition limit of the air-fuel ratio of the combustible mixture is expanded in such a way that a combustible mixture is located around the spark plug immediately before ignition, and air is located in the space in the combustion chamber, which surrounds the combustible mixture.

In such an engine, fuel is directly injected into the combustion chamber, and ignition is caused during the time the fuel is injected. Thus, the combustion system in this engine belongs in the category of the fuel droplet combustion system. Consequently, in order to obtain a good combustion in this engine, diverse technical KNOW HOW such as how to create a strong swirl motion, how to promote the atomization of fuel and where to locate of the spark plug relative to the injection nozzle is needed.

An object of the present invention is to provide an internal combustion engine capable of completely burning a lean air-fuel mixture, which can not be burned in an ordinary engine, without throttling the introduced air at the time of idling and at the time when the engine is operating under a light load.

According to the present invention, there is provided an internal combustion engine comprising: a cylinder block having therein a cylinder bore; a cylinder head mounted on said cylinder block and having therein two bores defining a first auxiliary chamber and a second auxiliary chamber; an intake valve and an exhaust valve which are movably mounted on said cylinder head; a piston reciprocally movable in said cylinder bore, said piston and said cylinder head forming therebetween a main combustion chamber into which gas is introduced via said intake valve at the time of the intake stroke; first passage means communicating said first auxiliary chamber with said main combustion chamber; second passage means communicating said second auxiliary chamber with said main combustion chamber; fuel injection means for injecting fuel into said second auxiliary chamber to form therein an extremely rich air-fuel mixture in which flame is extinguished, the amount of the fuel injected from said fuel injection means being regulated so that the mean value of the air-fuel ratio of the mixture contained in said main combustion chamber and in said first and said second auxiliary chambers is larger than the stoichiometric air-fuel ratio; third passage means communicating said first auxiliary chamber with said second auxiliary chamber for leading said extremely rich air-fuel mixture into said first auxiliary chamber and for forming a combustible mixture consisting of said extremely rich air-fuel mixture and of said gas in said first auxiliary chamber, and; ignition means in said first auxiliary chamber for igniting said combustible mixture and starting burning gas into said main combustion chamber via said first passage means, a part of said burning gas entering into said second auxiliary chamber for pushing out said extremely rich air-fuel mixture into said main combustion chamber via said second passage means and for burning the entire extremely rich air-fuel mixture in said main combustion chamber.

The present invention may be more fully understood from the following description of preferred embodiments of the invention, together with the accompanying drawings.

DESCRIPTION OF PREFERRED EMBODIMENTS

Figure 1:
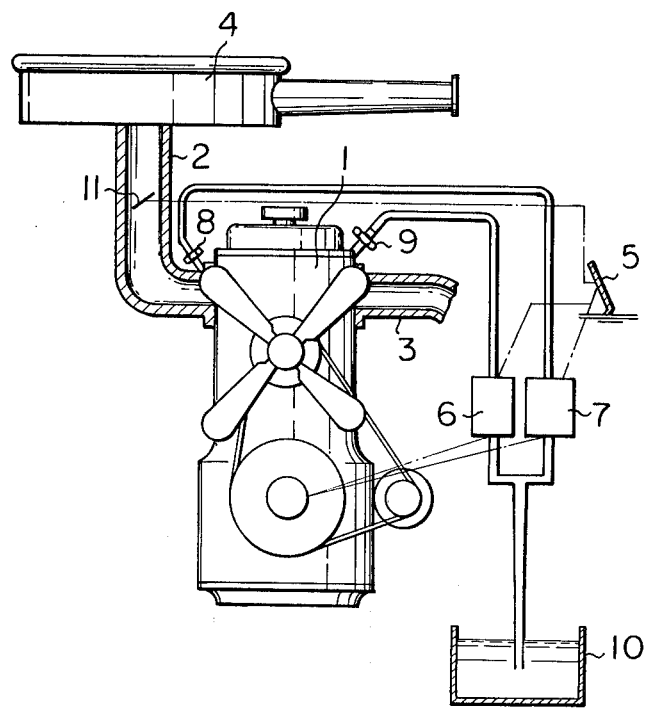
FIG. 1 is a schematic general view of an internal combustion engine according to the present invention.

Referring to FIG. 1, 1 designates an engine body, 2 an intake manifold, 3 an exhaust manifold, 4 an air cleaner, 5 an acceleration foot pedal disposed in the driver's compartment of a vehicle, 6 a first fuel injection pump driven by the engine and controlled by the accceleration pedal 5, 7 a second fuel injection pump driven by the engine and controlled by the acceleration pedal 5, 8 a second fuel injection nozzle mounted on the intake manifold 2 and connected to the second fuel injection pump 7, 9 a first fuel injection nozzle connected to the first fuel injection pump 6, 10 a fuel tank and 11 a throttle valve. However, as is hereinafter described, it is not always necessary to provide the throttle valve 11, the second fuel injection nozzle 8 and the second fuel injection pump 7.

In the embodiment shown in FIG. 1, the throttle valve 11 is so constructed that it remains opened to a predetermined extent, which is larger than the opened extent of the throttle valve at the time of idling in a conventional engine, until the acceleration pedal is depressed to a predetermined extent. When the accelerator pedal is depressed to the predetermined extent, the first fuel injection pump 6 sucks an amount of fuel from the fuel tank 10 in accordance with the depression of the acceleration pedal 5, while the second fuel injection pump 7 remains inactive.

When the acceleration pedal 5 is depressed beyond the above-mentioned predetermined extent, the throttle valve 11 comes into engagement with the acceleration pedal 5, so that the opening degree of the throttle valve 11 is increased in accordance with an increase in depression of the acceleration pedal 5, and; as a result the amount of introduced air is regulated by the throttle valve 11. When this occurs, the second fuel injection pump 7 sucks from the fuel tank 10 an amount of fuel corresponding the amount of the introduced air and, then, the fuel is injected into the intake manifold 2 from the second fuel injection nozzle 8 to form an air-fuel mixture in the intake manifold 2. Then, the mixture thus formed is introduced into the combustion chamber of the engine. On the other hand, when the second fuel injectin pump is active as described above, the first fuel injection pump 6 comes into disengagement with the acceleration pedal 5 so that a constant amount of fuel is always fed into the combustion chamber of the engine from the first fuel injection nozzle 9.

The fuel injection system shown in FIG. 1 is operated as follows. For the convenience of illustration, the level of load of the engine when the acceleration pedal 5 is depressed below the above-mentioned predetermined extent is hereinafter called an idling-light load, while the level of load when the acceleration pedal 5 is depressed beyond the above-mentioned predetermined extent is hereinafter called a middle-heavy load.

The amount of air filtered by the air cleaner 4 is controlled by the throttle valve 11. The air is introduced into the combustion chamber of the engine via the intake manifold 2. When the engine is operating under an idling-light load, a constant volume of air is introduced into the combustion chamber of the engine via the throttle valve 11, which remains opened to the above-mentioned predetermined extent. The output power of the engine is regulated by only controlling the amount of fuel directly injected into the combustion chamber of the engine from the first fuel injection nozzle 9. On the other hand, when the engine is operating under a middle-heavy load, the amount of air is controlled by the throttle valve 11, the opening degree of which is increased in accordance with an increase in the depression of the acceleration pedal 5. An amount of fuel corresponding to the amount of the introduced air is injected into the intake passage 2 from the second fuel injection nozzle 8 to form an air-fuel mixture in the intake manifold 2 and, then, the combustible mixture thus formed is introduced into the combustion chamber of the engine. At this time, a constant amount of fuel is directly injected into the combustion chamber of the engine from the first fuel injection nozzle 9. The burned gas is discharged into the atmosphere via the exhaust manifold 3 similar to an ordinary engine.

Figure 2:
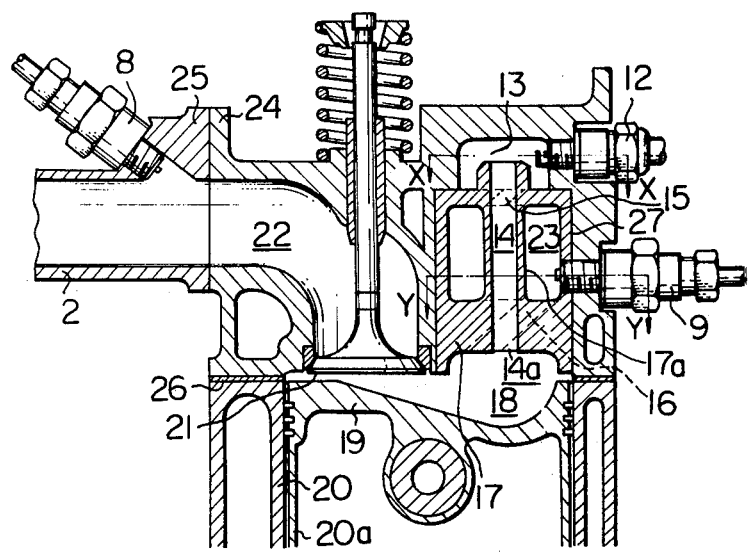
FIG. 2 is a cross-sectional view of the engine body of an embodiment shown in FIG. 1.
Figure 3:
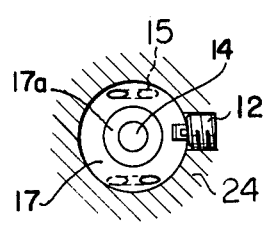
FIG. 3 is a cross-sectional view taken along the line X—X in FIG. 2.
Figure 4:
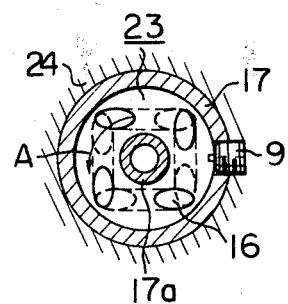
FIG. 4 is a cross-sectional view taken along the line Y—Y in FIG. 2.

The construction of the engine body 1, shown in FIG. 1, will be described with reference to FIG. 2. In FIG. 2, an internal combustion engine according to the present invention comprises a cylinder block 20, a cylinder 20a formed in the cylinder block 20, a piston 19 reciprocally movable in the cylinder 20a, a cylinder head 24 fixed onto the cylinder block 20 via a gasket 26, an intake valve 21 and an exhaust valve (not shown) which are mounted on the cylinder head 24, and an intake port 22 formed in the cylinder head 24. The opening operation of the intake port 22 is controlled by the intake valve 21. The intake port 22 is connected to the intake manifold 2 and, as is hereinbefore mentioned, the second fuel injection nozzle 8 is mounted on the intake manifold 2. The internal combustion engine according to the present invention further comprises a main combustion chamber 18 formed between an inner wall of the cylinder head 24 and a top surface of the piston 19, an auxiliary chamber component 17 press-fitted into a recess 27 formed in the cylinder head 24, a first auxiliary chamber 13 formed in the innermost end of the recess 27 and defined by the cylinder head 24 and by the auxiliary chamber component 17, and a second auxiliary chamber 23. The first auxiliary chamber 13 is connected to the second auxiliary chamber 23 via two connecting passages 15 (see FIG. 3) on one hand, and to the main combustion 18 via a connecting passage 14 on the other hand. The second auxiliary chamber 23 is connected to the main combustion chamber 18 via four connecting passages 16 (see FIG. 4) which open into the main combustion chamber 18 at a position near the position 14a at which the connecting passage 14 opens into the main combustion chamber 18. A hollow cylindrical thin wall 17a is formed in the second auxiliary chamber 23 so as to pass through the second auxiliary chamber 23. This hollow cylindrical thin wall 17a forms a common wall defining a part of the inner wall of the second auxiliary chamber 23 and, at the same time, defining the inner wall of the connecting passage 14. A spark plug 12 is located in the first auxiliary chamber 13, and the fuel injection nozzle 9 is located in the second auxiliary chamber 23. FIG. 3 shows a cross-sectional view taken along the line X—X in FIG. 2, and FIG. 4 shows a cross-sectional view taken along the line Y—Y in FIG. 2.

As is hereinbefore mentioned, at the time of the intake stroke when the engine is operating under an idling-light load, only air is introduced into the main combustion chamber 18 via the intake manifold 2, the intake port 22 and the intake valve 21 which is opened. Fuel is injected into the second auxiliary chamber 23 so that the fuel injecting operation is completed when the piston 19 reaches a position near bottom dead center. At the time of the compression stroke, the air in the main combustion chamber 18 is forced into the first auxiliary chamber 13 via the connecting passage 14, on one hand, and into the second auxiliary chamber 23 via the connecting passages 16, on the other hand. The connecting passages 16 are so arranged that, at this time, the air forced into the second auxiliary chamber 23 causes a swirl motion in the secondary auxiliary chamber 23 as is shown by the arrow A in FIG. 4. The common wall 17a is heated by the burning jet started into the main combustion chamber 18 from the first auxiliary chamber 13 in the preceeding cycle. Consequently, the fuel injected from the first fuel injection nozzle 9 and impinging against the common wall 17a is rapidly vaporized due to the heat of the common wall 17a and, then, the fuel thus vaporized is fully mixed with the swirled air. As a result of this, an extremely rich air-fuel mixture is formed in the second auxiliary chamber 23. However, in the present invention, the amount of fuel injected from the first fuel injection nozzle 9 is regulated so that the mean value of the air-fuel ratio of the mixture contained in the main combustion chamber 18 and in the first and second auxiliary chambers 13, 23 is larger than the air-fuel ratio of the mixture used in an ordinary engine. Then, a part of the rich air-fuel mixture formed in the second auxiliary chamber 23 passes through the connecting passages 15 and is mixed with the air contained in the first auxiliary chamber 13. As a result of this, a combustible mixture is formed around the spark gap of the spark plug 12. At the end of the compression stroke, the combustible mixture in the first auxiliary chamber 13 is ignited by the spark plug 12, and the flame rapidly spreads over the entire space of the first auxiliary chamber 13. Then, a part of the burning gas thus formed in the first auxiliary chamber 13, and having a high temperature is started into the main combustion chamber 18 via the connecting passage 14, while a part of the remaining burning gas is started into the second auxiliary chamber 23 via the connecting passages 15. As is mentioned above, an extremely rich air-fuel mixture is formed in the second auxiliary chamber 23. Thus, the flame entering into the second auxiliary chamber 23 is extinguished and, as a result, the mixture in the second auxiliary chamber 23 is not burned. The pressure in the second auxiliary chamber 23 is gradually elevated as the burning gas enters into the second auxiliary chamber 23 via the connecing passages 15 and, thus a rich air-fuel mixture is started from the second auxiliary chamber 23 into the main combustion chamber 18 via the connecting passages 16 towards a position near the position 14a in which the connecting passage 14 opens into the main combustion chamber 18. The rich air-fuel mixture started from the connecting passages 16 is mixed with the air in the main combustion chamber 18 and is ignited by the burning jet started from the connecting passage 14. Then, the flame spreads over the entire space of the main combustion chamber 18. Consequently, the fuel injected into the second auxiliary chamber 23 from the first fuel injection nozzle 9 is completely burned in the main combustion chamber 18 due to the pushing-out operation of the rich air-fuel mixture caused by the burning gas entering into the second auxiliary chamber 23 and due to the burning jet started from the connecting passage 14. The connecting passage 15 is so arranged that the rich air-fuel mixture can be easily diffused into the first auxiliary chamber 13.

As is hereinbefore mentioned, when the engine is operating under a middle-heavy load, fuel is injected into the intake manifold 2 from the second fuel injection nozzle 8 in addition to the fule injected into the second auxiliary chamber 23 from the first injection nozzle 9. Consequently, in this case, a lean air-fuel mixture is introduced into the main combustion chamber 18. However, in the present invention, the amount of fuel injected from the first and second fuel injection nozzles 9, 8 is regulated so that the mean value of an air-fuel ratio of the mixture contained in the main combustion chamber 18 and in the first and second auxiliary chamber 13, 23 is larger than the air-fuel ratio of the mixture used in an ordinary engine. In the case wherein the engine is operating under the middle-heavy load, the combustion is effected in the same manner as in the case wherein the engine is operating under the idling-light load. Therefore, description of the operation of the engine is omitted.

Figure 5:
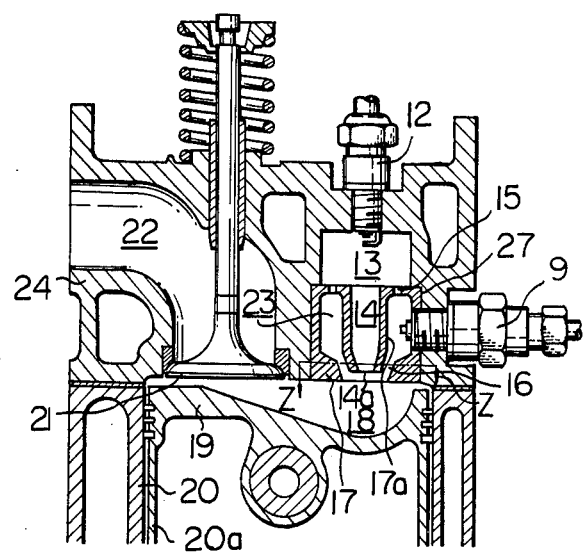
FIG. 5 is a cross-sectional view of an engine body of an alternative embodiment according to the present invention.
Figure 6:
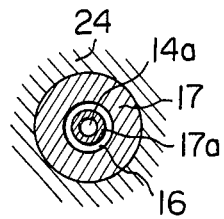
FIG. 6 is a cross-sectional view taken along the line Z—Z in FIG. 5.

FIG. 5 shows an alternative embodiment according to the present invention. In FIG. 5, similar components to those in FIG. 2 are indicated with the same reference numerals as used in FIG. 2. Referring to FIG. 5, the cross-sectional area of the open end 14a of the connecting passage 14, which opens into the main combustion chamber 18, is restricted compared with that at any other portion of the connecting passage 14 and, as is shown in FIG. 6, the connecting passage 16 opens into the main combustion chamber 18 in the form of an annular opening located around the open end 14a. Consequently, the heat insulation ability of the common wall 17a is increased compared with that of the common wall 17a shown in FIG. 2 and, as a result, the ability of heating a rich air-fuel mixture in the second auxiliary chamber 23 is improved.

Similar to the embodiment shown in FIG. 2, at the end of the compression stroke, a combustible mixture in the first auxiliary chamber 13 is ignited. When a part of the burning gas thus formed in the first auxiliary chamber 13, and having a high temperature, is started into the main combustion chamber 18 via the connecting passage 14, the velocity of the burning jet flowing in the open end 14a is higher than that of the rich air-fuel mixture pushed out from the second auxiliary chamber 23 via the annular connecting passage 16. As a result of this, the rich air-fuel mixture fully vaporized in the second auxiliary chamber 23 is sucked into the main combustion chamber 18 due to ejector effect, whereby all of the fuel injected into the second auxiliary chamber 23 can be burned in the main combustion chamber 18.

In order to obtain a strong burning jet and feed all of the fuel in the second auxiliary chamber 23 into the main combustion chamber 18, according to an experiment conducted by the inventors, it was proven that it is preferable that the first axuiliary chamber have a volume of 8 through 12 percent relative to the total volume of the combustion chamber of the engine. In addition, it is also preferable that a ratio of the cross-sectional area ($cm^2$) of the open end 14a of the connecting passage 14 to the volume ($cm^3$) of the first auxiliary chamber 23 be within the range of 0.08 through 0.12 ($cm^{-1}$). Furthermore, while it is preferable that the second auxiliary chamber 23 have a volume of 10 through 30 percent relative to the total volume of the combustion chamber of the engine, if the second auxiliary chamber 23 has a volume of more than 30 percent relative to the total volume of the combustion chamber, it is not necessary to provide the throttle valve 11, the second fuel injection pump 7 and the second fuel injection nozzle 8. In this case, even if the engine is operating under any type of load, the throttling operation of the introduced air is not effected. In addition, in this case, even if the amount of fuel fed into the combustion chamber is regulated by the first fuel injection pump 6 and, thus, all of the fuel necessary for combustion is fed into the second auxiliary chamber 23 from the first fuel injection nozzle 9, a good combustion can be obtained.

While the present invention is hereinbefore described with reference to the embodiment in which the fuel is injected from the second fuel injection nozzle 8 into the intake manifold 2 when the engine is operating under a middle-heavy load, instead of using this fuel injection system, there may be used a carburetor capable of injecting fuel into the intake manifold 2 only when the engine is operating under a middle-heavy load. In addition, a multi fuel can be used as the fuel injected into the intake manifold 2 and injected into the second auxiliary chamber 23. Furthermore, a ceramic, a sintered metal and a heat resistable material, such as a stainless steel alloy, can be used as the material of the auxiliary chamber component 17.

According to the present invention, since the stratified layer, consisting of a combustible mixture layer and of an extremely rich air-fuel mixture in which the flame is extinguished, can be formed in the auxiliary combustion chamber comprising the first and second auxiliary chamber, and all of the fuel injected into the second auxiliary chamber can contribute to the combustion in the main combustion chamber, even if the mean value of an air-fuel ratio of the mixture contained in the combustion chamber is very much larger than the stoichiometric air-fuel ratio, ease of ignition and a good combustion can be obtained. As a result of this, a good combustion can be obtained without throttling the introduced air at the time of idling and at the time the engine is operating under a light load, thereby greatly improving the fuel consumption and reducing the amount of harmful HC, CO and $NO_x$ components in the exhaust gas.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine comprising:
   a cylinder block having therein a cylinder bore;
   a cylinder head mounted on said cylinder block and having therein two internal areas defining a first auxiliary chamber and a second auxiliary chamber;
   an intake valve and an exhaust valve which are movably mounted on said cylinder head;
   a piston reciprocally movable in said cylinder bore, said piston and said cylinder head forming therebetween a main combustion chamber into which gas is introduced via said intake valve at the time of the intake stroke;
   a high velocity burning jet outlet means communicating said first auxiliary chamber with said main combustion chamber, said outlet means having a cross-sectional area smaller than that of said first auxiliary chamber and also serving as a combustion gas inlet means;
   first passage means communicating said second auxiliary chamber with said main combustion chamber;
   fuel injection means for injecting fuel into said second auxiliary chamber to form therein an extremely rich air-fuel mixture in which flame is extinguished, the amount of the fuel injected from said fuel injection means being regulated in accordance with the load level of the engine;
   second passage means between said first auxiliary chamber and said second auxiliary chamber for leading said extremely rich air-fuel mixture into said first auxiliary chamber to form a combustible mixture consisting of said extremely rich air-fuel mixture and of said gas already in said first auxiliary chamber, and;
   ignition means in said first auxiliary chamber for igniting said combustible mixture and directing some of the burning gas into said main combustion chamber via said high velocity burning jet outlet means, a part of said burning gas also entering into said second auxiliary chamber for pushing out said extremely rich air-fuel mixture into said main combustion chamber via said first passage means and for burning the entire extremely rich air-fuel mixture in said main combustion chamber.

2. An internal combustion engine as claimed in claim 1, wherein the amount of the fuel injected from said fuel injection means is regulated so that the mean value of the air-fuel ratio of the mixture contained in said main combustion chamber and in said first and said second auxiliary chambers is larger than the stoichiometric air-fuel ratio.

3. An internal combustion engine as claimed in claim 1, wherein said high velocity burning jet outlet means is defined by a circumferential wall which forms a part of an inner wall defining said second auxiliary chamber.

4. An internal combustion engine as claimed in claim 3, wherein said first auxiliary chamber is arranged at a position located remote from said main combustion chamber with respect to said second auxiliary chamber, said circumferential wall being formed by a cylindrical hollow wall passing through said second auxiliary chamber.

5. An internal combustion engine as claimed in claim 3, wherein said fuel injection means comprises a fuel injector disposed in said second auxiliary chamber, the nozzle of said fuel injector being directed to said part of an inner wall defining said second auxiliary chamber.

6. An internal combustion engine as claimed in claim 1, wherein said second passage means comprises at least one connecting passage opening into said main combustion chamber at a position near the position in which said first passage means opens into said main combustion chamber.

7. An internal combustion engine as claimed in claim 6, wherein said connecting passage is so arranged that gas entering into said second auxiliary chamber via said connecting passage causes a swirl motion in said second auxiliary chamber.

8. An internal combustion engine as claimed in claim 6, wherein said high velocity burning jet outlet means has a circular open end at a position in which said high velocity burning jet outlet means opens into said main combustion chamber and said connecting passage has an annular opening arranged around said circular open end.

9. An internal combustion engine as claimed in claim 8, wherein the cross-sectional area of said circular open end is restricted.

10. An internal combustion engine as claimed in claim 1, wherein said gas, which is introduced into said main combustion chamber via said intake valve, is air.

11. An internal combustion engine as claimed in claim 1, further including means to add fuel to said gas introduced via said intake valve whereby said gas introduced into said main combustion chamber is an air-fuel mixture, means to regulate the amount of the fuel injected from said fuel injection means in accordance with load level of the engine when the engine is operating under the idling-light load, and means to regulate the amount of fuel in the mixture contained in said main combustion chamber and in said first and said second auxiliary chambers in accordance with the load level of the engine when the engine is operating under the middle-heavy load.

12. An internal combustion engine as claimed in claim 11, further comprising an intake passage having a throttle valve and a fuel injector therein and wherein said air-fuel mixture introduced into said main combustion chamber is a lean air-fuel mixture.

13. An internal combustion engine as claimed in claim 12, including means to maintain said throttle valve open to a predetermined extent and means to maintain said fuel injector in said intake passage inactive at the time of idling and at the time the engine is operating under a light load.

14. An internal combustion engine as claimed in claim 1, wherein said high velocity burning jet outlet means comprises a connecting passage having an open end at which said connecting passage opens into said main combustion chamber, said first auxiliary chamber having a volume of 8 through 12 percent relative to the total volume of said main combustion chamber and of said first and said second auxiliary chamber, a ratio of the cross-sectional area of said open end of said connecting passage to the volume of said first auxiliary chamber being within the range of 0.08 through 0.12 ($cm^{-1}$).

15. An internal combustion engine according to claim 1, wherein the openings of said first passage means into said main combustion chamber are positioned near the lower open end of said high velocity burning jet outlet means whereby the rich air-fuel mixture pushed out from said second auxiliary chamber into said main combustion chamber is ignited by the burning jet projecting from said high velocity burning jet outlet means.

* * * * *